Feb. 14, 1939.　　　L. ROSENBLOOM　　　2,147,612
PROJECTION APPARATUS
Filed March 20, 1937
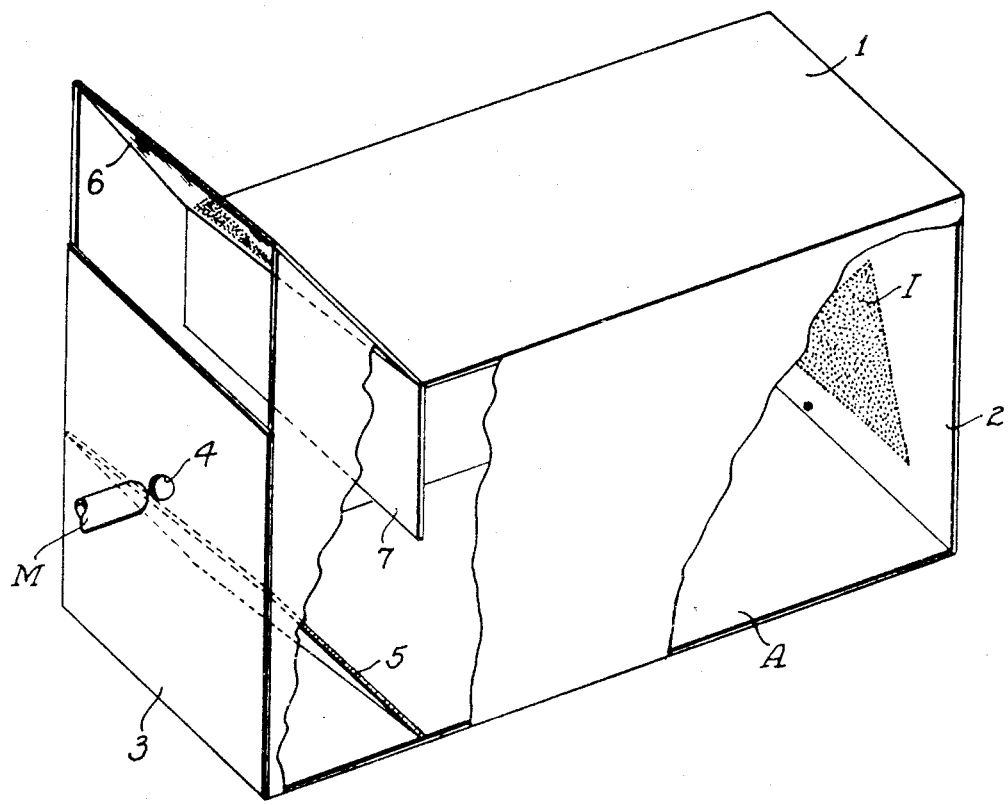
Inventor
LOUIS ROSENBLOOM
By- Ben V. Zillman
Attorney Patented Feb. 14, 1939

2,147,612

UNITED STATES PATENT OFFICE 2,147,612

PROJECTION APPARATUS

Louis Rosenbloom, St. Louis, Mo., assignor of one-half to John P. Catsiglanis, St. Louis, Mo.

Application March 20, 1937, Serial No. 132,051

2 Claims. (Cl. 88—24)

This invention relates broadly, to projection apparatus, but more particularly to a means whereby images, either still or animated, may be viewed in daylight or in lighted places, and permit of the person projecting said images to be on the same side of the apparatus as the audience viewing the images.

The invention has among its objects, the production of a device of the kind described, which will be neat and simple in appearance and construction, economical to install, efficient, and otherwise satisfactory for use wherever deemed applicable.

Another object of my invention is to provide an apparatus of the kind described, in which the extraneous light of the room in which the apparatus is situated, is efficiently and substantially completely absorbed, or at least blocked off from admission in such degree as to cause poor visibility of the images, so that such images may be viewed with a maximum of comfort and ease and without eye-strain.

A further object of my invention is to so provide such apparatus that it will have an image-receiving screen at one end of a housing, the size of the screen depending upon the strength of the projection machine and other details, the other end of the housing having an opening therethrough to permit the image to be projected therethrough onto said screen, and then to reflect said image from the screen forwardly and upwardly to a point above the said opening, so as to permit of easy and comfortable viewing of the reflected image from the same side of the housing as the projectionist.

Many other objects and advantages of the construction herein shown and described will be obvious to those skilled in the art to which this invention appertains, from the disclosures herein given.

To this end, my invention consists in the novel construction, arrangement and combination of parts herein shown and described, and uses mentioned, as will be more clearly pointed out in the claims hereunto appended.

In the drawing, wherein like reference characters indicate like or corresponding parts throughout the views, The figure is a perspective view of my improved device, as seen from the front of the same, and with portions thereof broken away in order to show the construction more clearly.

Referring more particularly to the drawing, wherein I have shown a preferred embodiment of my invention, I have shown the lens holder or similar part of a projection machine having film or slides therebehind, the source of light for the projection not being shown, as it does not form a part of my invention.

Such projection machines are in universal use, for many purposes, ranging from purely entertainment to sales build-up, and obviously it is quite often advantageous for either the lecturer, salesman, or other person vitally interested in the reaction of the audience, to observe the latter as the show progresses. This is done best in a lighted room. The drawback to showing such pictures in a room lighted by daylight or artificial light, is that heretofore, the projection machine had to face the audience, and throw onto a ground glass or the like between the projection machine and the audience, and it was therefore virtually impossible for the operator to be a real part of the audience.

In my improved construction, I have so constructed an image-receiving apparatus that the operator (and the projection machine itself) will be on the same side of the projection apparatus as the audience, and yet extraneous light will be effectively cut off from interference with the clarity of observation of the image being viewed. This is accomplished by cutting off light interference, as just mentioned, and by reflecting the image to a point where it can be easily and comfortably observed by the audience.

To this end, I have constructed the projection apparatus of a screen upon which the picture image is thrown, the excess light being cut off from the same, and then reflecting said image forwardly and upwardly therefrom. There is a housing A, of substantially elongated shape, with enclosing side walls 1, there being a screen 2 either forming the rear wall itself, or closely adjacent thereto, and upon which the images from the projection machine M are thrown.

The front wall 3 is provided with an opening 4 therethrough, and through which the projected rays of the image pass from the apparatus M, passing therethrough and showing on said screen.

A reflector, such as a mirror 5, is placed within the housing, adjacent the front end of the latter, facing the screen, and at an angle thereto, as for example, the substantially 45° angle shown. A second reflector 6 is spaced above said reflector 5 and facing the latter substantially parallel thereto. The images thrown onto the screen are then reflected upwardly by the reflector 5, onto the second reflector 6, and then the audience may view the images thus thrown onto the upper reflector.

The efficiency or effectiveness of the images viewed on the upper reflector, is dependent upon the completeness with which the extraneous light is prevented from leaking into the housing and onto the screen 2, and hence I have provided special means to insure a more complete cut-off of such light. A partition 7 extends across the housing between said pair of reflectors, said partition being preferably black, as are the inside surfaces of the housing itself (except the screen), and depending from adjacent the rear lowermost edge of the upper reflector 6 to a point whose elevation is approximately that of the uppermost edge of the bottom reflector 5, and hence will not interfere with the proper transmission of the images through the opening 4. A screen constructed in accordance with this invention will be in almost complete darkness, and hence it will display the images thereon with maximum visibility, and similarly such images will be reflected and transferred by said reflectors to the desired plane without any loss in effectiveness.

Having thus described my invention, it is obvious that various immaterial modifications may be made in the same without departing from the spirit of my invention; hence I do not wish to be understood as limiting myself to the exact form, arrangement, construction and combination of parts herein shown and described, except as limited by the state of the art to which this invention appertains, and the claims hereunto appended.

What I claim as new and desire to secure by Letters Patent is:

1. A projection apparatus, comprising a housing having an image-receiving screen adjacent one end, an opening adjacent its other end and through which the image may be projected onto said screen, a second opening at said last-mentioned end entirely above the height of said screen, and a pair of reflectors intermediate said opening and screen, one substantially above and one below said opening, said upper reflector being entirely above said screen, whereby the image may be viewed reflected onto the uppermost reflector, through said second opening, from in front of the housing.

2. A projection apparatus for viewing images in daylight or the like, comprising a housing having a vertical image-receiving screen within said housing adjacent its rear, and an opening at its front through which the image may be projected onto said screen, a second opening at the front of said housing substantially entirely above the height of said screen, a pair of substantially parallel reflectors lying in planes at an angle to that of said screen and opposed to one another adjacent the front of said housing, one substantially entirely above and the other entirely below said opening, whereby the projected image may be viewed reflected in the upper reflector, from in front of said housing, and an opaque partition depending from adjacent the rear of the upper reflector to adjacent the uppermost edge of the lower reflector to cut off extraneous light therepast into the housing.

LOUIS ROSENBLOOM.